US008689203B2

(12) United States Patent
Parthasarathy (10) Patent No.: US 8,689,203 B2
(45) Date of Patent: Apr. 1, 2014

(54) SOFTWARE UPDATE TECHNIQUES BASED ON ASCERTAINED IDENTITIES

(75) Inventor: Srivatsan Parthasarathy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 12/033,868

(22) Filed: Feb. 19, 2008

(65) Prior Publication Data

US 2009/0210868 A1    Aug. 20, 2009

(51) Int. Cl.
*G06F 9/44* (2006.01)

(52) U.S. Cl.
USPC ............. 717/168; 717/172; 717/174; 726/22; 726/23; 726/25; 713/188

(58) Field of Classification Search
USPC .............................. 717/168–178; 726/22–25; 713/150–181, 187–188
See application file for complete search history.

(56) References Cited

U.S. PATENT DOCUMENTS

| | | | |
|---|---|---|---|
| 5,555,418 A * | 9/1996 | Nilsson et al. ................ | 717/153 |
| 5,933,599 A | 8/1999 | Nolan | |
| 5,974,384 A | 10/1999 | Yasuda | |
| 6,138,100 A | 10/2000 | Dutton et al. | |
| 6,185,535 B1 | 2/2001 | Hedin et al. | |
| 6,256,623 B1 | 7/2001 | Jones | |
| 6,360,363 B1 * | 3/2002 | Moser et al. ................. | 717/170 |
| 3,000,474 A1 | 1/2003 | Kheirolomoom | |
| 6,795,806 B1 | 9/2004 | Lewis et al. | |
| 6,847,970 B2 | 1/2005 | Keller | |
| 6,915,452 B2 * | 7/2005 | Froehlich et al. ................ | 714/28 |
| 6,976,251 B2 * | 12/2005 | Meyerson ..................... | 717/173 |
| 6,988,249 B1 | 1/2006 | Arvanitis et al. | |
| 7,085,716 B1 | 8/2006 | Even et al. | |
| 7,200,210 B2 | 4/2007 | Tang | |
| 7,200,530 B2 | 4/2007 | Brown | |
| 7,308,408 B1 | 12/2007 | Stifelman et al. | |
| 7,490,288 B2 | 2/2009 | Undasan | |

(Continued)

FOREIGN PATENT DOCUMENTS

| | | |
|---|---|---|
| JP | 2000311040 | 11/2000 |
| JP | 2006251298 | 9/2006 |
| KR | 20000063555 | 11/2000 |

OTHER PUBLICATIONS

"Virtualized Application Delivery with Cisco Application Control Engine (ACE)", Retrieved from http://www.cisco.com/en/US/prod/collateral/modules/ps2706/ps6906/prod_white_paper0900aecd8066bfe2_ps7027_Products_White_Paper.html on Mar. 24, 2008., 8 pages.

(Continued)

*Primary Examiner* — Lewis A Bullock, Jr.
*Assistant Examiner* — Tina Huynh
(74) *Attorney, Agent, or Firm* — Tony Azure; Andrew Sanders; Micky Minhas (57) ABSTRACT

Software update techniques are described. In at least one implementation, updates are filtered based on criticality to operation of one or more items of software. A plurality of identities are published to a plurality of computing devices, each for a respective one of the updates that are filtered as being critical to the operation of the one or more items of software. The updates that are not filtered as being critical to the operation of the one or more items of software are made available via polling.

20 Claims, 4 Drawing Sheets

(56) References Cited

U.S. PATENT DOCUMENTS

| | | | |
|---|---|---|---|
| 7,599,915 | B2 | 10/2009 | Hill et al. |
| 7,650,284 | B2 | 1/2010 | Cross et al. |
| 7,865,952 | B1* | 1/2011 | Hopwood et al. ............. 726/22 |
| 2002/0077830 | A1 | 6/2002 | Suomela et al. |
| 2003/0120502 | A1 | 6/2003 | Robb |
| 2003/0139925 | A1 | 7/2003 | Anderson et al. |
| 2003/0156130 | A1 | 8/2003 | James et al. |
| 2003/0182414 | A1* | 9/2003 | O'Neill ......................... 709/223 |
| 2004/0260438 | A1 | 12/2004 | Chernetsky et al. |
| 2005/0015760 | A1* | 1/2005 | Ivanov et al. ................ 717/168 |
| 2005/0091259 | A1 | 4/2005 | Parthasarathy |
| 2005/0262076 | A1* | 11/2005 | Voskuil ............................ 707/8 |
| 2005/0273779 | A1* | 12/2005 | Cheng et al. ................. 717/168 |
| 2006/0005162 | A1 | 1/2006 | Tseng |
| 2006/0070012 | A1 | 3/2006 | Milener et al. |
| 2006/0123414 | A1 | 6/2006 | Fors |
| 2006/0168541 | A1 | 7/2006 | Hill et al. |
| 2006/0245354 | A1 | 11/2006 | Gao |
| 2006/0277482 | A1 | 12/2006 | Hoffman et al. |
| 2007/0124149 | A1 | 5/2007 | Shen et al. |
| 2007/0130276 | A1 | 6/2007 | Zhang et al. |
| 2007/0168348 | A1* | 7/2007 | Forsyth ........................... 707/10 |
| 2007/0174898 | A1* | 7/2007 | Maes et al. ........................ 726/2 |
| 2007/0180407 | A1 | 8/2007 | Vahtola |
| 2007/0240151 | A1* | 10/2007 | Marl et al. .................... 717/174 |
| 2007/0297581 | A1 | 12/2007 | Kuo et al. |
| 2008/0028389 | A1* | 1/2008 | Genty et al. ................. 717/174 |
| 2008/0148248 | A1* | 6/2008 | Volkmer et al. ............... 717/168 |
| 2009/0150872 | A1* | 6/2009 | Russell et al. ................ 717/140 |
| 2009/0248397 | A1 | 10/2009 | Garcia |

OTHER PUBLICATIONS

"Kaseya Fast and Easy Deployment", Retrieved from http://www.kaseya.com/products/remote-software-deployment.php on Mar. 24, 2008., 1 Page.

"PCT Search Report and Written Opinion", Application No. PCT/US2009/035471, (Aug. 27, 2009), 11 pages.

Heydarnoori, Abbas et al., "Reliable Deployment of Component-based Applications into Distributed Environments", *Proceedings of the 3rd International Conference on Information Technology: New Generations*, Available at <http://ieeexplore.ieee.org/xpl/freeabs.all.jsp?arnumber=1611570.>,(Apr. 2006),6 Pages.

"Extended European Search Report", EP Application No. 09726134.1, (May 23, 2011),4 pages.

"Extended European Search Report", European Patent Application No. 09726134.1, (May 23, 2011), 4 pages.

"Foreign Office Action", Chinese Application No. 200980110574.1, (Aug. 9, 2011), 7 pages.

"Method to Pace User Input for Speech Recognition Systems", *IBM Technical Disclosure Bulletin*, vol. 37, No. 10, (Oct. 1, 1994),2 pages.

"Non-Final Office Action", U.S. Appl. No. 12/055,291, (Sep. 16, 2011),17 pages.

"Final Office Action", U.S. Appl. No. 12/055,291, (Feb. 24, 2012),11 pages.

"Foreign Office Action", Chinese Application No. 200980110574.1, (May 24, 2012),7 pages.

"Foreign Office Action", Russian Application No. 2010139457, (Dec. 18, 2012),6 pages.

"Foreign Office Action", Chinese Application No. 200980110574.1, (Jan. 14, 2013), 6 pages.

Lyon, Jack "How to Give Your PC Voice Commands", *CNET Networks, Inc.*, 2008, (Sep. 15, 2003), 1 page.

Cimon, "Youincate Voice Shortcuts 0.8b Description", BlueChillies.com, (2000-2007), 2 pages.

"Revolutionary Voice UI for Mobile", *User Interfaces 1.3*, pp. 1-8.

"Foreign Office Action", Japanese Application No. 2011501868, (May 14, 2013), 6 pages.

"Foreign Office Action", Chinese Application No. 200980110574.1, (Jul. 3, 2013), 6 pages.

Lyon, Jack "How to Give Your PC Voice Commands", *CNET Networks, Inc.*, (Sep. 15, 2003), 1 page.

"Non-Final Office Action", U.S. Appl. No. 12/055,291, Jan. 13, 2014, 19 pages.

"Foreign Office Action", Japanese Application No. 2011-501868, Oct. 11, 2013, 4 Pages.

\* cited by examiner

402
Ascertain an identity of software that indicates a unique name and version of the software

404
Compare the ascertained identity of the software with the published identifies

406
When the identity of the software corresponds to one or more of the published identifiers, determine whether the software is current

408
When the software is not current, block execution of the software until current

410
When the software is current, permit execution of the software

412
When the identity of the software does not correspond to the one or more published identities, permit execution of the software

*Fig. 4*

SOFTWARE UPDATE TECHNIQUES BASED ON ASCERTAINED IDENTITIES

BACKGROUND

Software is continually developed to provide a wide range of functionality. For example, software may be configured as applications that are developed for productivity (e.g., word processing and spreadsheets), to abstract functionality of a computing device (e.g., an operating system), to locate information (e.g., a browser), and so on. Additionally, the sophistication of this functionality is ever increasing along with the desire to gain access to this functionality as quickly as possible. For example, it may be desirable to provide increased functionality for an application between software launches to increase user satisfaction with the software.

Accordingly, techniques were developed to update applications between product launches through use of a "software update", which is also known simply as an "update". Updates can be configured in a variety of ways, such as to fix vulnerabilities that may be exploited by malicious parties, add later developed functionality to an application after launch, and so on. However, traditional techniques that were utilized to provide updates were inefficient and did not address a variety of different ways in which users may interact with software. Therefore, in some instances even though an update was available the limitations of traditional techniques that were available to locate and determine whether the update was available prevented utilization of the update.

SUMMARY

Software update techniques are described. In at least one implementation, a request is detected at a computing device to initiate execution of software. An identity is ascertained that indicates a unique name and version of the software. The ascertained identity of the software is compared with one or more published identities that are pre-cached at the computing device to determine whether the software is current. When the software is not current, execution of the software on the computing device is blocked.

In at least one implementation, updates are filtered based on criticality to operation of one or more items of software. A plurality of identities are published to a plurality of computing devices, each for a respective one of the updates that are filtered as being critical to the operation of the one or more items of software. The updates that are not filtered as being critical to the operation of the one or more items of software are made available via polling.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Application update techniques are described. As previously described, software update techniques were developed to keep software current between product launches, such as to fix known vulnerabilities that may be exploited by malicious parties, add additional features, and so on. One traditional technique that was employed to provide updates was based upon scanning a computing device and then polling for updates to the device.

For example, a traditional polling technique involved a scan of a computing device to determine which software was available, which was then used as a basis for the poll. However, software that was installed on an external device (e.g., a portable "thumb drive") may not be caught by the scan if it not accessible when the scan is performed. For instance, a user may install an application on a USB memory device for use on a variety of different desktop computers. Therefore, scans that were performed on these computers may not be able to locate the application and consequently would not "know" whether to check for an update to the application. Similar instances may also be encountered by applications and other software executed via a network.

Software update techniques are described. In an implementation, a check is performed when execution of software is initiated to determine whether the software is current (e.g., "up-to-date") by including a latest software update. Therefore, execution of the software may be managed regardless of where the software is installed, e.g., on a portable memory device designed for portable use by a plurality of computing devices, over a network, and so on.

In an implementation, the updates are managed using at least two techniques. First, updates which are determined to be critical to execution of software (and consequently operation of a computing device that executes the software) may be filtered and identified using an identifier. A variety of considerations may be employed to determine criticality, such as when the update relates to security of the software as opposed to a general "look and feel" of user interface. The identities may then be published to computing devices, which may be used by the computing devices to determine whether the updates that correspond to the identities are pertinent to the computing device. Continuing with the previous example, the management techniques described in the previous paragraph may be employed to determine pertinence to software when execution is requested. When the update is pertinent, execution of corresponding software may be blocked until the update is installed.

Secondly, polling techniques may be employed for non-critical updates. For example, a polling technique may be employed in which an online service that provides updates is checked to determine whether an update to software is available. If so, the update may be downloaded and installed. In this way, critical updates may be installed in a timely manner (e.g., based on the pre-cached identities), when relevant, that conserves resources of the computing device, network and a service that provides the updates. Thus, the critical updates are not subject to the "window of vulnerability" of traditional polling techniques. Further, non-critical updates may also be installed using polling to provide desired functionality without exposing the computing device to vulnerabilities, further discussion of which may be found in relation to FIG. 3.

In the following discussion, an example environment is first described that is operable to employ software update techniques. Example procedures are then described that may operate in the example environment, as well as in other environments. Accordingly, reference to the example environment is made by way of example as an aid to the discussion and is not limited to that environment.

Example Environment

Figure 1:
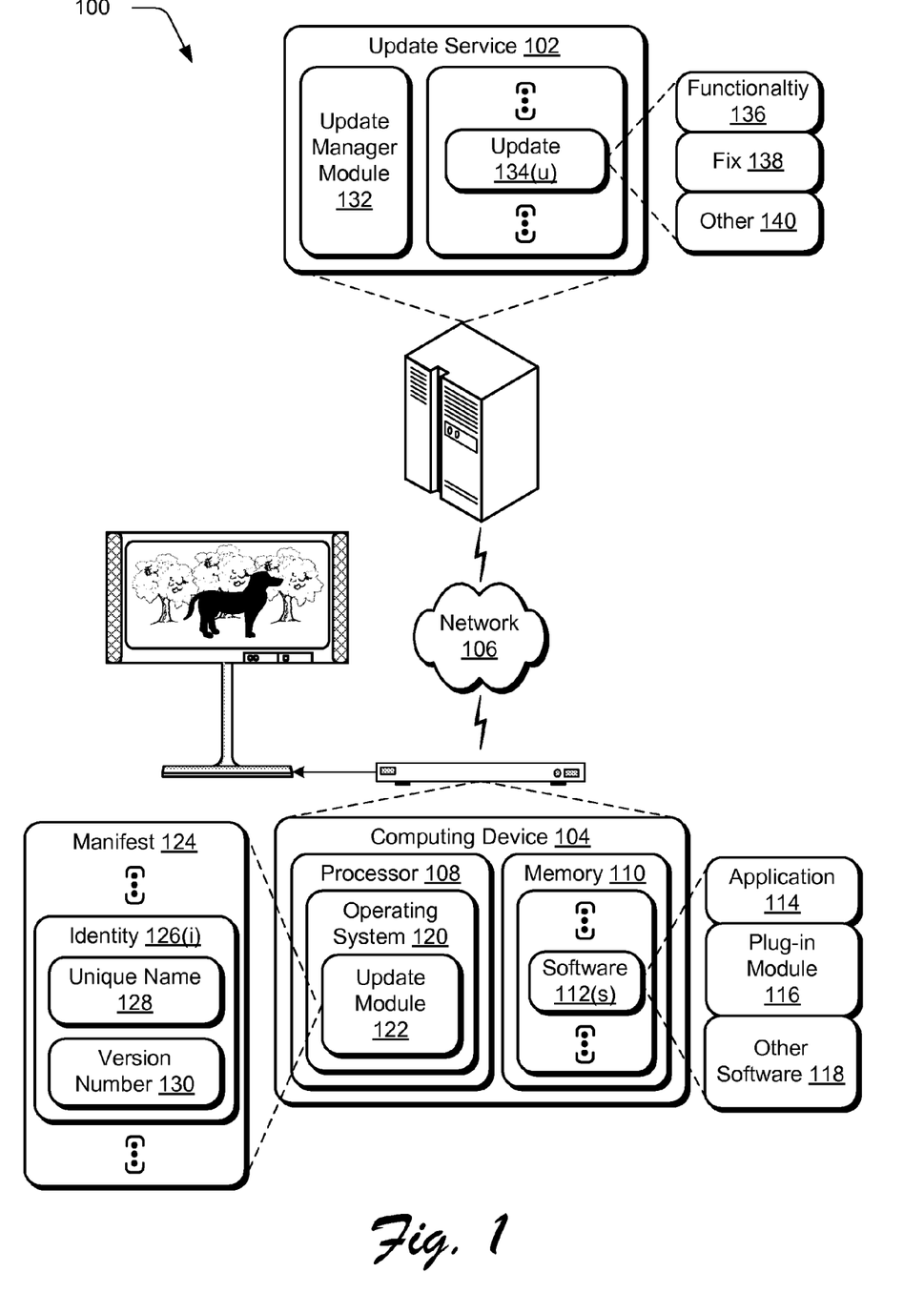
FIG. 1 is an illustration of an environment in an example implementation that is operable to employ software update techniques.

FIG. 1 is an illustration of an environment 100 in an example implementation that is operable to employ software update techniques. The illustrated environment 100 includes an update service 102 and a computing device 104 that are communicatively coupled, one to another, via a network 106. The computing device 104 may be configured in a variety of ways. For example, the computing device 104 may be configured as a computer that is capable of communicating over the network 106, such as a desktop computer, a mobile station, an entertainment appliance, a set-top box communicatively coupled to a display device, a wireless phone, a game console, and so forth. Thus, the computing device 104 may range from full resource devices with substantial memory and processor resources (e.g., personal computers, game consoles) to a low-resource device with limited memory and/or processing resources (e.g., traditional set-top boxes, handheld game consoles). The computing device 104 may also relate to an entity that operates the computing device 104, such as software.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 108 may be configured to include multiple networks.

The update service 102 is illustrated as being implemented via a server, which may be representative of one or more servers. Further, the computing device 104 is illustrated as including a processor 108 and memory 110. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110 is shown, a wide variety of types and combinations of memory may be employed, such as random access memory (RAM), hard disk memory, removable medium memory, and other types of computer-readable media.

The computing device 104 is illustrated as including one or more items of software 112 in memory 110, which are executable by the processor 108. The software may be configured in a variety of ways, such as an application 114, plug-in module 116 that extends the functionality of an application, or other software 118. Another example of software is an operating system 120 which is illustrated as being executed on the processor 108 and is storable in memory 110.

The operating system 120 is further illustrated as including an update module 122, which is representative of functionality to update the operating system 120 and/or software 112(s) of the computing device 104. Although illustrated as part of the operating system, the update module 122 may be configured in a variety of other ways, such as a "stand alone" module, as part of one or more of the items of software 112(s), and so on.

The update module 122 may be configured to address the "window of vulnerability" that may be encountered under traditional update techniques. For example, traditional techniques that involved polling would periodically check for updates. Therefore, a window existed between the polls. Although the polling interval could be shortened, the increase in resources required to support the shorter interval made it expensive and in some cases was not able to scale to an application that was widely distributed (e.g., an operating system or browser) due to network bandwidth, server processing resources, and other considerations.

When it is time to poll for updates, for instance, a traditional system would scan a local device to check for whether updates that were made available are applicable to the device. This applicability analysis may involve a complex operation that could be inaccurate, as it is not easy or reliable to get a true inventory of the system using traditional techniques. Traditional reasons to perform this scan involved a desire to avoid the expense of downloading and installing updates that were not desired, e.g., the software for which the update pertains is not installed on the device.

Additionally, traditional scans may be inaccurate for a variety of reasons. For example, software may be installed in arbitrary versus deterministic places. The software, for instance, may be installed in a removable medium such as an USB keychain/flash drive that may be unplugged from the computing device 104 at the time the scan was initiated, the software may be run off the network, may be installed dynamically later (e.g., via an "ActiveX" control) and hence not detected at the time the scan is performed, and so on. Further, a scan may fail to detect software due to fragility in versioning semantics, e.g., an authoritative identity for software is not available.

Even when the traditional scanning techniques detected an instance in which to apply an update. Even though installation of the update may be initiated, it is still possible that due to some of the files being "in use" the traditional system may be unable to complete the installation of the fix until a reboot. Since the user is traditionally given a single option to reboot immediately (versus at a later time), it is possible for the system to be vulnerable long after the fix is "applied" but not installed.

Accordingly, the update module 122 may implement techniques in which a manifest 124 is used to pre-cache one or more identities 126(i) (where "i" may be an integer between one and "I") of a newly serviced version of a given item of software 112(s). The identity 126(i) includes the unique name 128 and version number 130. For example, the version number may have two or more logical parts, such as a functionality version that indicates new features and a servicing version which indicates compatible bug fixes including security fixes. In an implementation, the manifest 124 is downloaded and pre-cached, which may help overcome network bandwidth and computing device memory 110 expenses. In another implementation, however, the manifest 124 may be generated dynamically by the update module 122, further discussion of which may be found in relation to FIG. 3.

When software 112(s) is installed, for example, the update module 122 may check against the pre-cached identities obtained from the update service 102 to see if there are "current" (e.g., more recent) servicing versions available (as defined in the versioning scheme above) for the given functionality version that is being installed.

For instance, the update module 122 may communicate with the update service 102. The update service 102 is illustrated as including an update manager module 132 that is representative of functionality to manage one or more updates 134(u), where "u" may be an integer between one and "U". As previously described, updates may be configured in a variety of ways, such as to provide additional functionality 136 (e.g., a new feature), a "fix" 138 (e.g., to protect against a known vulnerability that may be exploited by a malicious party) and/or address other 140 update considerations.

Continuing with the previous example, the update service 102 may publish a list of identities that describe the one or more updates 134(u) that may be cached on the computing device 104. Therefore, the update module 122 may compare the identities of the software 112(s) with the identities in the manifest 124 to determine whether the software 112(s) is current.

Identities are not limited to name and version number, but may also include a wide variety of other information. For example, identities may include a number attributes (and be extensible to add many more) such as processor architecture, language/locale (e.g., French vs. English for localized software), debug vs. retail binaries, branch of software (e.g., QFE, GDR, SP1 vs. SP2) and so on. The update module may then use these additional attributes to see if the update is applicable and perform other best match determinations to provide a flexible update.

In another example, when execution of the software 112(s) in being initiated, the update module 122 may check the manifest 124 (e.g., which may be part of the software 112(s) or separate from the software 112(s)) to determine its current configuration. The current configuration may include a determination of what versions of dependent middleware components are installed or carried with the software 112(s) in an application directory.

Depending on administrative policy, for instance, the update module 122 may choose to look for updates at this time. In a scenario where the system has pre-cache serviced identities, then the update module 122 may check at this point to determine if an update 134(u) is available. If so, the update module 122 may block the execution of the software 112(s) until the update 134(u) is installed, download and apply the update 134(u) in the context of starting the software 112(s), and so on.

The manifest 124 may be formed in a variety of ways. For example, the update module 122 may be executed to add the manifest 124 to the software 112(s), obtain the manifest 124 from "outside" of the computing device 104 (e.g., from the update service 102 or another third-party service), and so on. Additionally, a web site may be provided where the community, enterprise administrators, OEMS, and so on may provide annotations for software 112(s) for comment and/or review by each other.

The update manger module 122 may also use polling techniques to obtain updates 134(u). For example, the update module 122 may use the identity techniques for updates that are determined to be "critical" to operation of the software 112(s) and consequently operation of the computing device 104. The update module 122 may also use polling techniques for other "non-critical" updates to conserve resources, further discussion of which may be found in relation to FIG. 2.

The update module 122 may also be configured to address "long-running" software. For example, in some implementations software is restarted infrequently and therefore techniques that rely upon a check at initialization may also suffer from a window of vulnerability. In such an instance, the update module 122 may provide a notification that is handled by the software 112(s). The software 112(s) may then control the user experience to receive the update 134(u), e.g., by prompting the user to save data/files. Additionally, the notification may also be used to alert the user of the updates 134(u), severity of the vulnerability being fixed, cost of download, and so on such that the user may schedule a most efficient way to secure operation of the computing device 104 and minimize intrusion, e.g., to save files and so on.

The update techniques may also include a variety of other features. For example, a current version of an update may be optionally pre-cached along with the identifier. In another example, an auto-download and install of the current/latest update may be performed in the context of finding that the software on the computing device is not current at the time of performing the check in the context of execution of the software on the machine. In a further example, a check for a current version may be performed by directly talking to the update service in the context of execution of software as opposed to consulting pre-cached identifiers. A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, an example of which is the memory 110. The features of the software update techniques described below are platform-independent, meaning that the techniques may be implemented on a variety of commercial computing platforms having a variety of processors.

Example Procedures

The following discussion describes software update techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
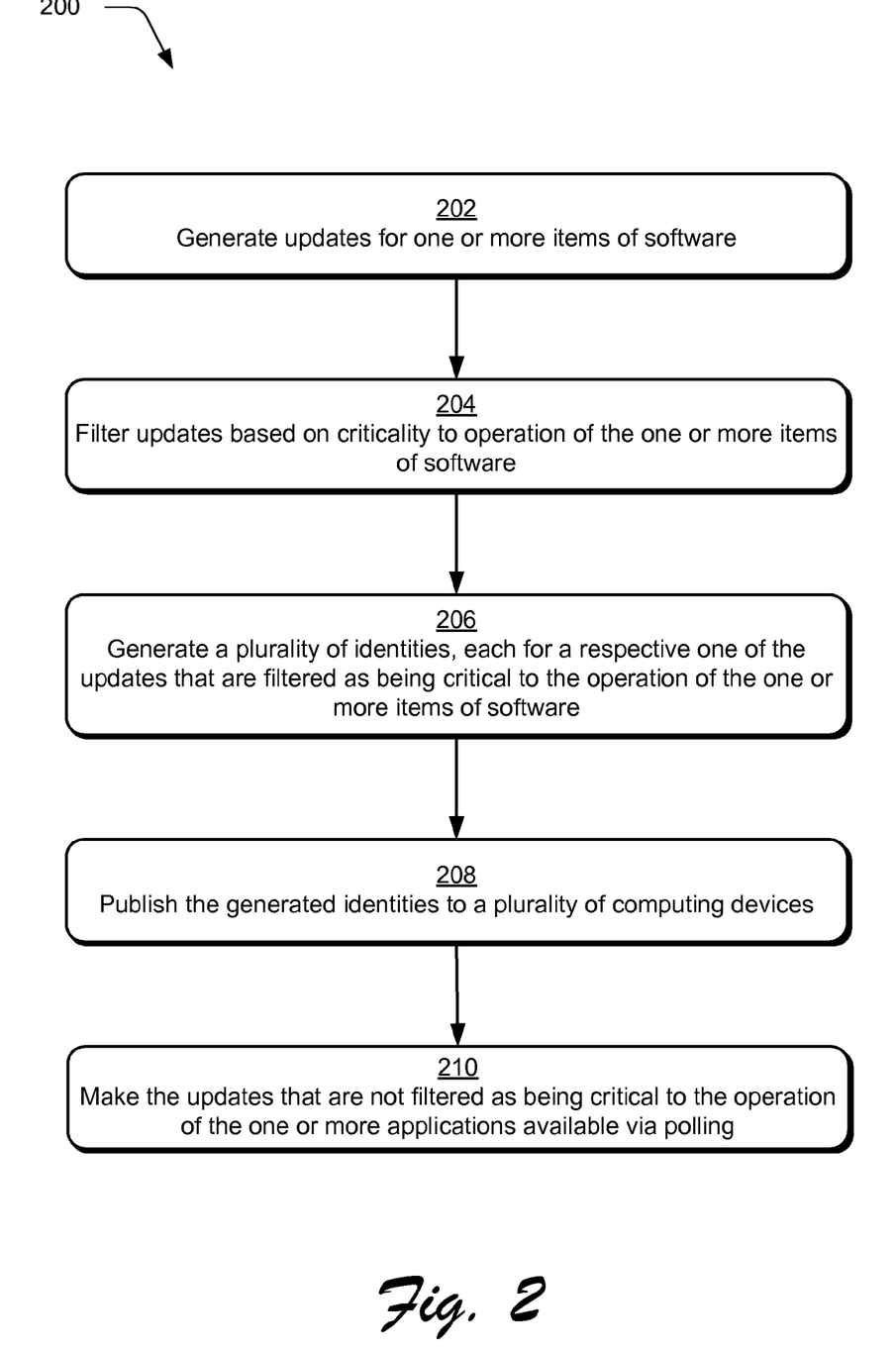
FIG. 2 is a flow diagram depicting a procedure in an example implementation in which updates are generated and made available to clients using identifier and polling techniques.

FIG. 2 depicts a procedure 200 in an example implementation in which updates are generated and made available to clients using identifier and polling techniques. Updates for one or more items of software are generated (block 202). As previously described, the updates may be configured in a variety of ways, such as plug-in modules, fixes to known vulnerabilities, additional functionality (e.g., features) to be added to applications, and so on. Likewise, software may also be configured in a variety of ways, such as applications, operating systems, plug-in modules, middleware, and so forth.

Updates are filtered based on criticality to operation of the one or more items of software (block 204). For example, security updates may be considered critical to operation of software, such as due to exposure of a vulnerability that may be exploited by a malicious party. An additional feature, on the other hand, such as another wallpaper for a desktop may not be considered critical to the operation of the software, as the software is likely to continue operation without adding this feature, e.g., the wallpaper.

A plurality of identities is generated, each for a respective one of the updates that are filtered as being critical to the operation of the one or more items of software (block 206). The identities, for instance, may indicate a new version number and/or service version as appropriate such that the update may be distinguished from past and/or future updates. In other words, the identifier may identify "where" in time the particular update relates to other updates. In an implementation, coding (e.g., a naming convention) may also be used with the identifier to indicate specific functionality incorporated within the update, such as whether the update is a fix to a known vulnerability, adds functionality (and if so, the particular functionality), and so on.

The generated identities are published to a plurality of computing devices (block 208). For example, the identities may be "pushed" via a message to the computing device 104, "pulled" by the computing device 104 by accessing the update service 102 over the network 106, and so on.

Updates that are not filtered as being critical to the operation of the one or more applications are made available via polling (block 210). Continuing with the previous example, updates that are not determined to be critical may be omitted from the list that is published to the computing device 104, thereby conserving resources of the update service 102, network 106 and the computing device 104 in providing these additional identities. Therefore, the non-critical updates may be made available via polling to be obtained at predetermined intervals, the length of which may be optimized based on resources of the update service 102. In this way, the computing device 104 may utilize a variety of techniques to obtain and implement updates, further discussion of which may be found in relation to the following figure.

Figure 3:
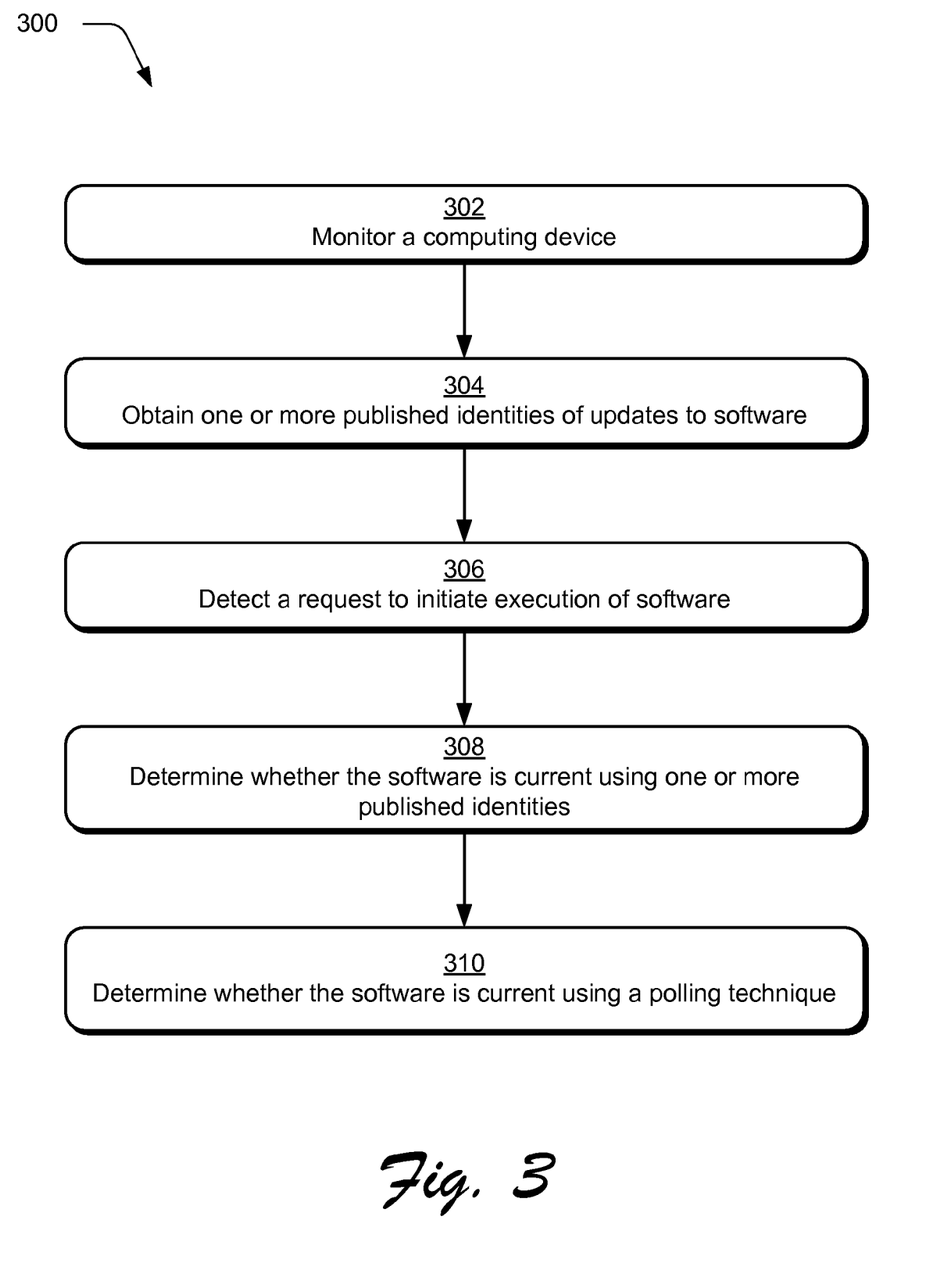
FIG. 3 is a flow diagram depicting a procedure in an example implementation in which software is updated on a computing device using an identifier and polling techniques.

FIG. 3 depicts a procedure 300 in an example implementation in which software is updated on a computing device using identifier and polling techniques. A computing device is monitored (block 302). The update module 122, for instance, may be incorporated as part of the operating system 120 such that the update module 122 may "follow" execution of software 112(s), e.g., when execution is initiated or terminated. The software 112(s) may be separate (e.g., an application) or integral to the operating system 120.

One or more published identities of updates to software are obtained (block 304). The update module 122, for instance, may receive a list of the identities from the update service 102, may "log on" to the update service 102 to download the list, and so on. In an implementation, the list of identities does not include the referenced updates, thereby conserving network 106 and computing device 104 resources.

A request is detected to initiate execution of software (block 306). The update module 122, for instance, may detect that a user has used an input device to request (e.g., via a "double click") execution of software 112(s). In another instance, software 112(s) may request execution of other software, such as another application, "middleware", a plug-in module, and so on.

A determination is made as to whether the software is current using one or more published identities (block 308). Continuing with the previous example, the update module 122 may use the published identities to determine whether the software 112(s) incorporated relevant "critical" updates, further discussion of which may be found in relation to FIG. 4. Thus, in this example the update module 122 may determine whether the software 112(s) incorporates critical updates 134(u) without checking status of whether non-critical updates have been installed, which reduces the delay in executing the software 112(s). It should be readily apparent that other implementations are also contemplated, such as by checking whether each update has been installed, whether critical or not.

A determination may also be made as to whether the software is current using a polling technique (block 310). For example, the update module 122 may poll the update service 102 at predetermined intervals, e.g., at regular times, due to an occurrence of an event (e.g., regaining network access), and so on. Thus, in this example non-critical updates may also be obtained without burdening resources used to provide the critical updates. A variety of other examples are also contemplated.

Figure 4:
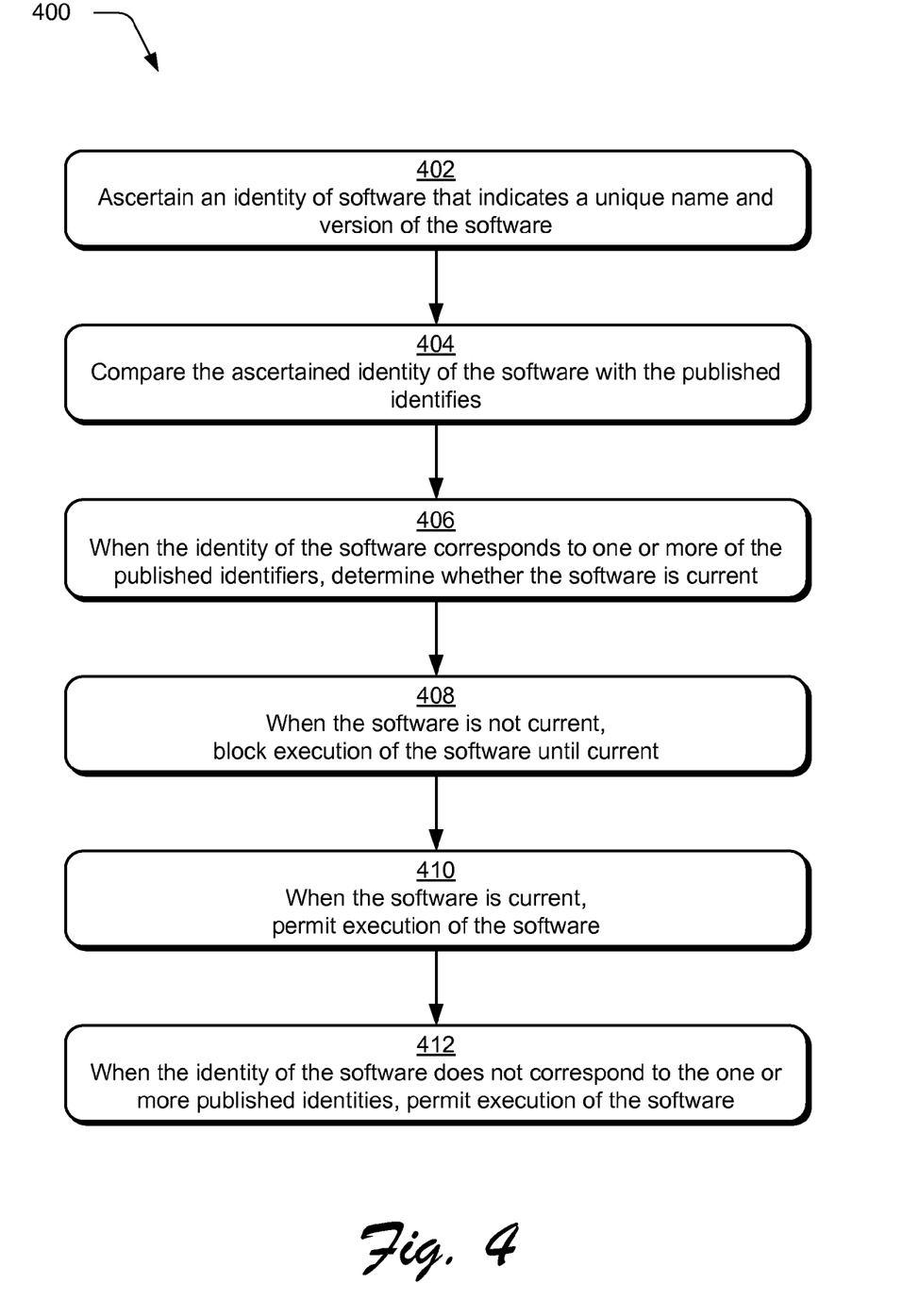
FIG. 4 is a flow diagram depicting a procedure in an example implementation in which identities are compared to determine if software is current, which is used to manage execution of the software.

FIG. 4 depicts a procedure 400 in an example implementation in which identities are compared to determine if software is current, which is used to manage execution of the software. An identity of software is ascertained that indicates a unique name and version of the software (block 402). For example, the identity may include a version number that has two or more logical parts, such as a functionality version that indicates new features and a servicing version which indicates compatible bug fixes including security fixes. The identity may be ascertained in a variety of ways, such as through a "stand alone" manifest that was generated by the update module 122, through metadata associated within the software 112(s) itself (i.e., the manifest 124 is a part of the software 112(s)), and so on.

The ascertained identity of the software is compared with the published identities (block 404). When the identity of the software corresponds to one or more of the published identities, a determination is made as to whether the software is current (block 406). For example, the identity of the software may match one of the published identities, which indicates that the software 112(s) is current, e.g., "up-to-date". The determination may also look for published identities of the software that are "more recent" than the ascertained identity of the software 112(s) that is installed on the computing device 104, which indicates that the software 112(s) is not current.

When the software is not current, execution of the software is blocked until current (block 408). The update module 122, for instance, may locate and install the update 134(u) that is referenced by the published identifier, which makes the software 112(s) current. When the software is current, execution of the software is permitted (block 410).

Further, when the identity of the software does not correspond to the one or more published identities, execution of the software is permitted (block 412). Continuing with the previous example of FIG. 2, failure to include an identifier for particular software 112(s) may indicate that a "critical" update 134(u) is not available. Accordingly, execution of the software 112(s) may be permitted and/or a non-critical update 134(u) may be installed at a later time in accordance with one or more polling techniques.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

detecting a request at a computing device to initiate execution of software;

ascertaining an identity that indicates a unique name and version of the software, and for one or more available updates of the software, the unique name indicating specific functionality incorporated within the one or more available updates and the version of the software including a functionality version that describes features of the software and a servicing version which indicates compatible bug fixes including security fixes that were installed for the software;

comparing the ascertained identity of the software with one or more published identities of the one or more available updates that are pre-filtered as involving updates to respective software operations of the computing device, the published identities being pre-cached at the computing device to determine whether one or more of the updates are available for the software and are critical updates to the software of the computing device;

when execution of the software is initiated, and responsive to a determination that the software is not current and that the one or more updates are available for the software:

blocking execution of the software on the computing device and updating the software while execution of the software is blocked responsive to a determination that the one or more available updates are critical to the operation of the computing device; and permitting execution of the software on the computing device while the software is not current and while updating the software via polling responsive to a determination that the one or more available updates are not critical to the operation of the computing device; and permitting execution of the software on the computing device when the identity of the software does not correspond to the one or more published identities or when the software is current.

2. A method as described in claim 1, wherein:

each of the published identities correspond to at least one said update; and the at least one said update is not available locally on the computing device when the comparison is performed.

3. A method as described in claim 1, wherein each of the published identities correspond to at least one said available update that is critical to the operation of the computing device.

4. A method as described in claim 3, further comprising polling for at least one said available update that is not critical to the operation of the computing device and is not referenced by the one or more published said identities.

5. A method as described in claim 3, wherein the published identities correspond to one or more security updates.

6. A method as described in claim 1, wherein the ascertaining is performed by checking a manifest that is included as a part of the software.

7. A method as described in claim 1, wherein the ascertaining is performed by checking a manifest that includes identities of a plurality of software that is installed on the computing device.

8. A system comprising:

an operating system configured to detect a request at a computing device to initiate execution of software; and an update manager module implemented at least partially in hardware, the update manager module configured to perform operation comprising:

ascertaining an identity that indicates a unique name and version of the software, and for one or more available updates of the software, the unique name indicating specific functionality incorporated within the one or more available updates and the version of the software including a functionality version that describes features of the software and a servicing version which indicates compatible bug fixes including security fixes that were installed for the software;

comparing the ascertained identity of the software with one or more published identities of the one or more available updates that are pre-filtered as involving updates to respective software operations of the computing device, the published identities being pre-cached at the computing device to determine whether one or more of the updates are available for the software and are critical updates to the software of the computing device;

when execution of the software is initiated, and responsive to a determination that the software is not current and that the one or more updates are available for the software:

blocking execution of the software on the computing device and updating the software while execution of the software is blocked responsive to a determination that the one or more available updates are critical to the operation of the computing device; and permitting execution of the software on the computing device while the software is not current and while updating the software via polling responsive to a determination that the one or more available updates are not critical to the operation of the computing device; and permitting execution of the software on the computing device when the identity of the software does not correspond to the one or more published identities or when the software is current.

9. A system as described in claim 8, wherein the one ore more published identities exclude the one or more available updates that are not critical to the operation of the computing device.

10. A system as described in claim 8, wherein the one or more published identities are published to a plurality of computing devices regardless of whether a respective said computing device includes software that corresponds to the one or more published identities.

11. A system as described in claim 10, wherein the one or more published identities are configured to cause the plurality of computing devices that include software that is not current, according to a respective said identity, to block execution on the computing device of the software corresponding to the respective said identity.

12. A system as described in claim 10, wherein the one or more published identities are configured to cause the plurality of computing devices that include software that is not current, according to a respective said identity, to install a respective said available update.

13. A system as described in claim 10, wherein the operations that the update manager module is configured to perform further comprise polling for at least one said available update that is not critical to the operation of the computing device and is not referenced by the one or more published said identities.

14. A system as described in claim 10, wherein the ascertaining is performed by checking a manifest that is included as a part of the software.

15. A system as described in claim 10, wherein the ascertaining is performed by checking a manifest that includes identities of a plurality of software that is installed on the computing device.

16. One or more computer-readable memory devices including instructions that are executable by a computing device to perform operations comprising:

detecting a request at the computing device to initiate execution of software;

ascertaining an identity that indicates a unique name and version of the software and for one or more available updates of the software, the unique name indicating specific functionality incorporated within the one or more available updates and the version of the software including a functionality version that describes features of the software and servicing version which indicates compatible bug fixes including security fixes that were installed for the software;

comparing the ascertained identity of the software with one or more published identities of the one or more of the available updates that are pre-filtered as involving updating of respective software operations of the computer device, the published identities are pre-cached at the computing device to determine whether one or more of the updates are available for the software and whether are critical updates to the software of the computing device;

when execution of the software is initiated, and responsive to a determination that the software is not current and that the one or more updates are available for the software:

blocking execution of the software on the computing device and updating the software while execution of the software is blocked responsive to a determination that the one or more of the available updates software is critical to the operation of the computing device;

permitting execution of the software on the computing device while the software is not current responsive and while updating the software via polling responsive to a determination that the one or more available updates are not critical to the operation of the computing device; and permitting execution of the software on the computing device when the identity of the software does not correspond to the one or more published identities or when the software is current.

17. One or more computer-readable memory devices as described in claim 16, wherein each of the published identities correspond to at least one said available update that is critical to the operation of the computing device.

18. One or more computer-readable memory devices as described in claim 16, wherein the software is an application, component of an operating system provided by the computing device or a plug-in module.

19. One or more computer-readable memory devices as described in claim 16, wherein the published identities correspond to the one or more available updates that relate to security.

20. One or more computer-readable memory devices as described in claim 16, wherein the operation further comprise polling for at least one said available update that is not critical to the operation of the computing device and is not referenced by the one or more published said identities.

* * * * *